United States Patent
Cavelius et al.

(10) Patent No.: US 12,006,148 B2
(45) Date of Patent: Jun. 11, 2024

(54) STACKING STORAGE ARRANGEMENT

(71) Applicant: Jungheinrich Aktiengesellschaft, Hamburg (DE)

(72) Inventors: Jörg Cavelius, Bad Vilbel (DE); Michael Becker, Hainburg (DE); Markus Liebhaber, Oberursel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 444 days.

(21) Appl. No.: 17/028,085

(22) Filed: Sep. 22, 2020

(65) Prior Publication Data

US 2021/0122571 A1 Apr. 29, 2021

(30) Foreign Application Priority Data

Oct. 25, 2019 (EP) .................................. 19205237

(51) Int. Cl.
*B65G 1/04* (2006.01)

(52) U.S. Cl.
CPC ......... *B65G 1/0492* (2013.01); *B65G 1/0471* (2013.01)

(58) Field of Classification Search
CPC .................................................. B65G 1/0471
See application file for complete search history.

(56) References Cited

U.S. PATENT DOCUMENTS

| | | | | |
|---|---|---|---|---|
| 5,147,176 A * | 9/1992 | Stolzer | ................. | B65G 1/0471 700/218 |
| 5,156,514 A | 10/1992 | Zah | | |
| 9,505,556 B2 * | 11/2016 | Razumov | ............. | B65G 1/0492 |
| 10,022,867 B2 * | 7/2018 | Saboo | ................... | G05D 1/0274 |
| 10,112,774 B2 | 10/2018 | Arnold et al. | | |
| 10,351,346 B2 * | 7/2019 | Otto | .......................... | B66F 9/24 |
| 11,208,266 B2 * | 12/2021 | Kakinuki | ............. | B65G 1/0407 |
| 11,535,452 B2 * | 12/2022 | Stevens | ................ | B65G 1/1371 |
| 2017/0152106 A1 | 6/2017 | Hofmann | | |
| 2017/0166400 A1 | 6/2017 | Hofmann | | |
| 2019/0375589 A1 | 12/2019 | Gravelle et al. | | |
| 2019/0375590 A1 * | 12/2019 | Gravelle | ................ | B65G 1/137 |

(Continued)

FOREIGN PATENT DOCUMENTS

| | | |
|---|---|---|
| CN | 110 065 751 A | 7/2019 |
| CN | 110 356 754 A | 10/2019 |
| DE | 195 40 855 A1 | 5/1997 |

(Continued)

OTHER PUBLICATIONS

European Patent Office Search Report issued in European Patent Office (EPO) Patent Application No. 19205237.1, dated Apr. 17, 2020.

*Primary Examiner* — Mark C Hageman

(74) *Attorney, Agent, or Firm* — GREENBLUM & BERNSTEIN, P.L.C.

(57) ABSTRACT

A stacking storage arrangement having multiple container receiving spaces that are arranged in multiple rows and columns, wherein a loading space in which at least one loading vehicle can be moved is arranged beneath the container receiving spaces. The operation of a stacking storage arrangement of this type is configured to be economical. For this purpose, it is provided that, at least outside of the loading space, the loading vehicle can be moved in a direction which forms any desired angle with a direction that runs parallel to the rows.

13 Claims, 2 Drawing Sheets

(56) References Cited

U.S. PATENT DOCUMENTS

2022/0144546 A1* 5/2022 Tendo .................. B65G 1/1373

FOREIGN PATENT DOCUMENTS

| | | | | |
|---|---|---|---|---|
| DE | 10 2012 020899 A1 | 4/2014 | | |
| DE | 102013009340 | * 4/2014 | ............... | B65G 1/06 |
| DE | 10 2013 009340 A1 | 12/2014 | | |
| EP | 0 458 021 A1 | 11/1991 | | |
| JP | S60 71402 A | 4/1985 | | |
| JP | 6-592711 B1 | 10/2019 | | |
| WO | 2014/158090 A1 | 10/2014 | | |
| WO | 2016/023869 A2 | 2/2016 | | |

* cited by examiner

STACKING STORAGE ARRANGEMENT

CROSS-REFERENCE TO RELATED APPLICATIONS

The present application claims priority under 35 U.S.C. § 119 of European Patent Application No. EP 19205237.1, filed Oct. 25, 2019, the disclosure of which is expressly incorporated by reference herein in its entirety.

BACKGROUND

1. Field of the Invention

The present invention relates to a stacking storage arrangement having multiple container receiving spaces that are arranged in multiple rows and columns, wherein a loading space in which at least one loading vehicle can be moved is arranged below the container receiving spaces.

2. Discussion of Background Information

A stacking storage arrangement is used to accommodate a plurality of containers. Here, the containers can be stacked on top of one another, wherein the individual stacks are arranged in the container receiving spaces. In this manner, it is possible to utilize the available installation space relatively well, since the stacks can be arranged such that they are closely adjacent to one another.

The container receiving spaces are in this case arranged in the form of a matrix with rows and columns. Each container receiving space is then located at an intersection of a row with a column.

In the present case, the containers are introduced into the container receiving spaces from below and are also removed from the container receiving spaces from below. For this purpose, a loading vehicle is respectively used that, for the placement of a container into storage, picks up the container outside of the loading space, then drives into the loading space together with the container until it has arrived at the container receiving space in which the container in question is to be placed into storage. The loading vehicle then lifts the container until the container strikes a stack of containers from below, which stack is already arranged in the container receiving space. The container is then lifted together with the container stack until it has been guided past a holding device that holds the container with the stack located thereon in place against the force of gravity. If no container is present yet in the container receiving space, then only the container in question is held in place.

To remove the container from storage, the loading vehicle is used again, which loading vehicle is driven under the container stack and lifts the container stack together with the container being removed or being taken out of storage. The container is lifted until it comes free of the holding mechanism. The holding mechanism can then be released, and the container with the stack located on top of it is lowered. The holding device thereby engages, up to this point, the second-to-last container of the stack from below, so that the remaining stack is held in the container receiving space.

The loading vehicle with the container being removed from storage is then driven out of the loading space.

SUMMARY

The operation of the stacking storage arrangement of the invention is configured to be economical.

This is achieved with a stacking storage arrangement of the type described above, at least outside of the loading space, by configuring the loading vehicle to be movable in a direction that forms any desired angle with a direction that runs parallel to the rows.

Thus, inside of the loading space, the loading vehicle can be moved in a direction that is parallel to the rows. In other words, inside of the loading space, the loading vehicle can be driven in a row in order to transport a container from one column to the next, or to transport the container out of the loading space or into the loading space. However, no further directional constraint is provided outside of the loading space; instead the loading vehicle can be moved virtually in any desired direction outside of the loading space. Even though this includes the direction that runs parallel to the rows, it is also possible to move the loading vehicle in another direction so that the container located on the loading vehicle can also be brought to locations, or can be picked up from these locations, which can be distributed outside of the loading space in virtually any desired manner.

Preferably, the loading space comprises an entry region that is arranged at the front faces of the rows and/or columns. The loading vehicle can only enter the loading space in the entry region. This simplifies the control of the loading vehicle.

Advantageously, the loading vehicle can be moved between rows in the loading space. It can also be provided inside of the loading space that the loading vehicle can switch rows. Here, it is expedient that the loading vehicle on the one hand is moved parallel to the direction of the rows and on the other hand parallel to the direction of the columns. These two directions are perpendicular to one another.

Preferably, the loading space comprises a driving surface that extends outside of the loading space. The driving surface can, for example, be embodied by a floor on which the uprights of the stacking storage arrangement stand. However, the driving surface can also be formed by rails or the like so that there is no dependence on the quality of the floor, which has a positive effect on the positioning accuracy of the loading vehicles.

Here, it is preferred that the driving surface has a distance from a floor on which the uprights of the stacking storage arrangement stand, wherein the driving surface transitions into the floor in or in front of the entry region. The driving surface can then, for example, transition into the floor with a small ramp having a slight slope so that the loading vehicle can move freely on the floor outside of the driving surface.

Preferably, multiple placement-into-storage/removal-from-storage arrangements are provided, at least one of which is arranged outside of an extension of a row. Thus, there is no longer the limitation of arranging all placement-into-storage/removal-from-storage arrangements in front of the stacking storage arrangement. Instead, it is possible to position the placement-into-storage/removal-from-storage arrangements in a location where a corresponding installation space is available and where the respective containers can be loaded or unloaded.

Preferably, at least one placement-into-storage/removal-from-storage arrangement has at least one container transfer position for transferring a container from the placement-into-storage/removal-from-storage arrangement to the loading vehicle or vice versa. The loading vehicle can then deliver the container to the placement-into-storage/removal-from-storage arrangement, and is subsequently available to transport additional containers. The loading vehicle is thus not tied up while an operator introduces products or objects into the container or removes them from the container.

Here it is preferred that the container transfer position comprises a tray beneath which an entry surface for the loading vehicle is arranged. As stated above, the present stacking storage arrangement is supplied from below, that is, a container being placed into storage is introduced into a container receiving space from below and a container being removed from storage is removed from the container receiving space from below. Accordingly, the loading vehicle has a means of lifting and lowering the container. This can be utilized for the container transfer position. The loading vehicle can drive into the container transfer position, wherein during the driving-in the container is arranged higher than a tray surface of the tray. When the loading vehicle is then located on the entry surface below the tray, the container can be lowered in order to be transferred to the tray. The loading vehicle then comes free of the container and can be used for other operations.

Preferably, a removal-from-storage arrangement is arranged in front of the entry region. This is particularly advantageous if the stacking storage arrangement is used to keep products on hand which are to be shipped from a mail-order business, for example. In this case, most of the containers must be brought into the removal-from-storage arrangement, in which an operator or an automatic handling system can remove products from the container, more frequently than into a placement-into-storage arrangement, where the container can be loaded with the corresponding products. If the removal-from-storage arrangement is arranged in front of the entry region, the paths to the removal-from-storage arrangement are kept short.

Here, it is preferred that the removal-from-storage arrangement is arranged between the entry region and a transfer element. Order or shipment containers can be made available on the transfer element, into which containers the corresponding products are introduced. The transfer element can then bring the order or shipment containers to a shipping station or to another removal-from-storage arrangement in which additional products can be placed into the order or shipping container, for example a cardboard box.

Preferably, at least one placement-into-storage arrangement is arranged in a region that extends parallel to the rows. The placement-into-storage arrangement can thus be arranged alongside the rows. However, it can also be arranged next to the entry region. In the placement-into-storage arrangement, products are placed into storage in a container. The placement-into-storage arrangement is then primarily selected from the perspective of how the products being placed into storage can be made available in a simple and/or cost-effective manner.

Preferably, a control device, or controller, is provided which specifies a position of a container in the container receiving spaces as a function of a turnover frequency of the container. It is thus possible to optimize the times required to remove a container from the stacking storage arrangement. The control device specifies the position of a container that has a high turnover frequency in such a manner that it requires less time to be removed from the stacking storage arrangement than a container which is turned over less frequently.

Here, it is preferred that the control device specifies the position of a container having a high turnover frequency in a lower region of a container receiving space. Fewer containers thus need to be restacked when the container in question is removed from the container receiving space. If the container being removed is already the bottom container of a stack, no restacking operations at all need to be carried out. This saves time.

It is also advantageous if the control device specifies the position of a container having a high turnover frequency in a column that is closer to the entry region than the position of a container having low turnover frequency. In this case, the times that the loading vehicle requires from the respective column to the entry region can be kept short.

Preferably, the control device determines the turnover frequency of containers dynamically during operation. It is thus not necessary to know the turnover frequency of the respective containers from the outset. Instead, the control device identifies which containers are needed often and which containers are needed less often, and configures the positioning of the containers in the stacking storage arrangement accordingly. This can result in the containers initially being distributed randomly in the rows, columns and stack positions and a redistribution according to the criteria described above only then taking place in the course of operation.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
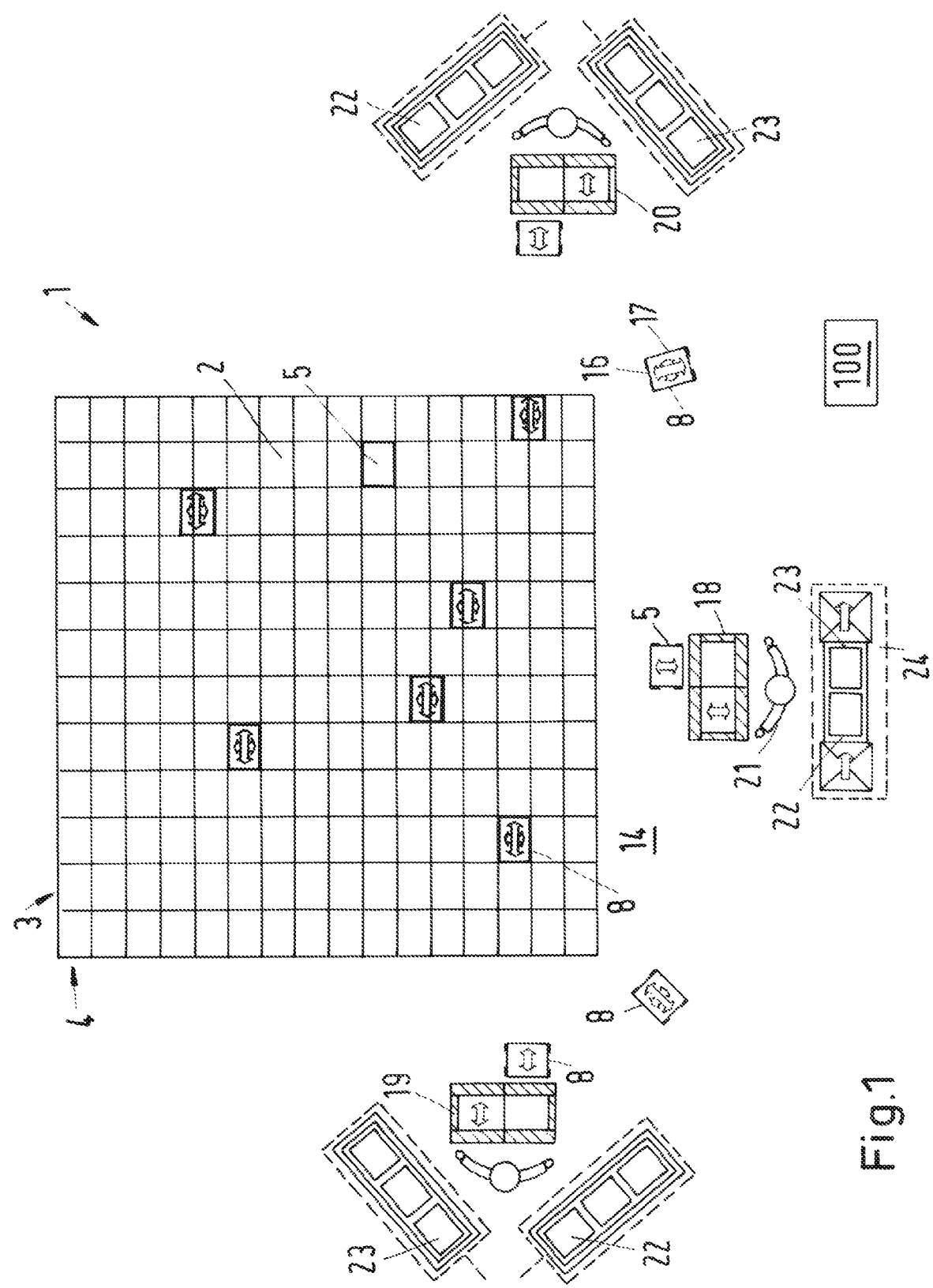
FIG. 1 shows a schematic top view of a stacking storage arrangement.

FIG. 1 shows a stacking storage arrangement 1 having a structure that defines plurality of container receiving spaces 2 that are arranged in rows 3 and columns 4. The container receiving spaces 2 are thus arranged in a matrix-like manner. Containers 5 can be placed into storage in the container receiving spaces 2. Here, multiple containers 5 can be arranged on top of one another in the form of a stack 6.

Below the container receiving spaces 2, a loading space 7 (FIG. 2) is provided in which one or more loading vehicles 8 can be moved. Each loading vehicle 8 comprises a container seat 9 that is height-adjustable. A container 5 can thus be lifted or lowered using the container seat 9, as described further below.

The loading space 7 preferably comprises a driving surface 10 that extends outside of the loading space 7, for example on a flooring 11. The driving surface 10 can, for example, be formed by the flooring 11 itself, on which the uprights 12 stand between which the container receiving spaces 2 are formed, and which carry a merely schematically illustrated holding device 13 with which the containers can be held such that the loading space 7 remains free. In the present exemplary embodiment, however, the driving surface 10 is arranged above the flooring 11 and does not transition into the flooring 11 until outside of the loading space 7.

The loading vehicles 8 can be moved on the driving surface 10 that is arranged above a flooring 11. The driving surface 10 can, for example, be attached to the uprights 12 which support the holding mechanism 13.

For the placement of a container 5 into storage, a loading vehicle 8 loaded with the container 5 is driven into the loading space 7 until the container 5 has arrived at the container receiving space 2 in which it is to be placed into storage. The container 5 is then lifted until it has been guided past the holding mechanism 13. The holding mechanism 13 then snaps into place in the container 5, for example, and holds it in place when the container seat 9 is lowered.

To remove the container 5 from storage, the loading vehicle 8 is once again moved under the corresponding loading space 2. The container seat 9 is lifted until it comes into contact with the container 5 being removed from storage. It then lifts the container 5 being removed from storage, possibly with a stack 6 located above it, so that the holding mechanism 13 can be released. The container 5 being removed from storage is then lowered and the holding mechanism 13 subsequently engages the container that was second from the bottom up to this point, so that the stack 6 is once again held in the container receiving space 2.

Figure 2:
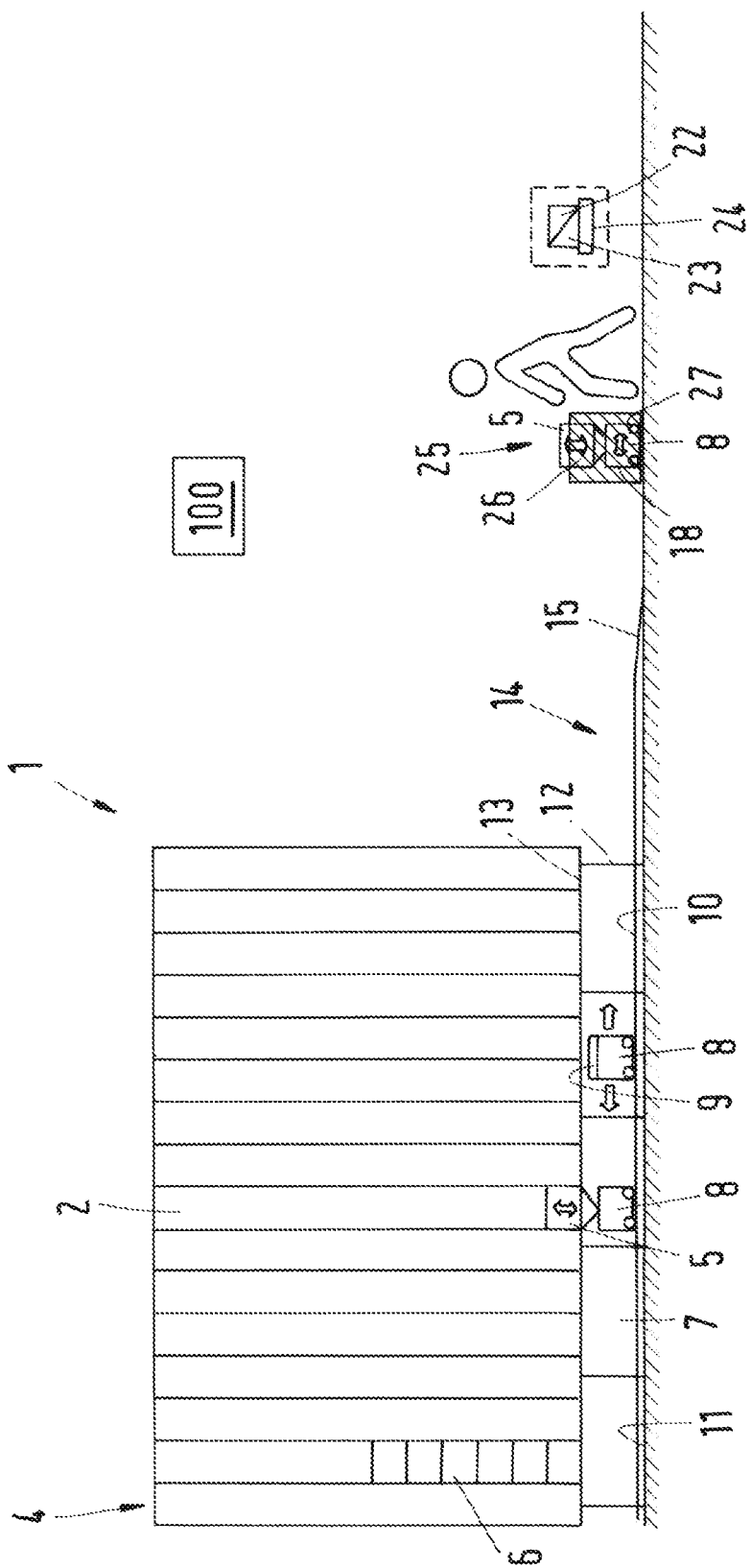
FIG. 2 shows a schematic side view of the stacking storage arrangement according to FIG. 1.

As can be seen in FIG. 2, the corresponding loading vehicle 8 is only driven into the loading space 7 in an entry region 14. The entry region 14 is arranged at the front faces of the rows 3. For this purpose, the driving surface 10 comprises a ramp 15 with which it transitions into the floor 11.

Alternatively or additionally, an entry region (not illustrated) can also be provided at the front faces of the columns 4, so that the loading vehicle 8 can additionally or solely be driven into the loading space from the sides.

Outside of the loading space 7, that is, possibly also in the region of the entry region 14, the loading vehicles 8 can be moved in virtually all directions. This is illustrated in FIG. 1 by two arrows 16, 17 that are directed perpendicularly to one another.

Accordingly, a loading vehicle 8 can be moved parallel to the direction of the rows 3 so that a movement out of a row 3 can continue in a straight line. However, the loading vehicle 8 can also be moved with a directional component that is aligned parallel to the direction of the columns 4. The loading vehicle 8 can also be moved "obliquely" to the direction of the rows 3 and columns 4, that is, can form an angle >0° with the direction of the rows 3 and also an angle >0° with the direction of the columns 4.

In FIG. 1, loading vehicles that are located beneath container receiving spaces 2 are also illustrated with the two directional arrows 16, 17. This means that a loading vehicle 8 located in the loading space 7 can also be moved between rows 3. The movement of a loading vehicle 8 located in the loading space 7 is therefore not limited to the direction of the rows 3. Expediently, the loading vehicle 8 will be moved parallel to the direction of the columns 4 if the loading vehicle 8 is to be moved between rows 3.

The stacking storage arrangement 1 illustrated in FIGS. 1 and 2 comprises multiple placement-into-storage/removal-from-storage arrangements 18, 19, 20. Here, the placement-into-storage/removal-from-storage arrangement 18 is provided as a removal-from-storage position into which a container 5 is brought if an operator 21 is to remove products from the container 5, for example in order to transfer them to an order container 22 (which can also be referred to as a shipment container). By contrast, the placement-into-storage/removal-from-storage arrangements 19, 20 are provided as placement-into-storage positions in which a container 5 can be supplied with products from source containers 23. The removal-from-storage position and the placement-into-storage positions are embodied to be identical in construction, however, so that the function and use can also be modified during operation. To demonstrate this, order containers 22 are also provided in the placement-into-storage/removal-from-storage-arrangements 19, 20 and a source container 23 is provided in the placement-into-storage/removal-from-storage arrangement 18.

The placement-into-storage/removal-from-storage arrangement 18 is located between a transfer element 24 and the entry region 14, for example. This is particularly advantageous during the removal of products from a container 5 and during the transfer of the corresponding products into the order container 22. The operator 21 merely needs to remove the product from the container 5 and then turn around, in order to place the product in the order container 22.

Normally, a container 5 is needed more frequently to remove a product therefrom than to place products into storage in the container 5. During placement into storage, a larger quantity of corresponding products can be placed into storage in the container 5 at one time. During removal from storage, fewer products are normally removed from the container 5. Accordingly, it is additionally advantageous if the placement-into-storage/removal-from-storage arrangement 18 that is used as a removal-from-storage position is arranged at a short distance from the container receiving spaces 2.

As stated above, the placement-into-storage/removal-from-storage arrangements 18-20 are embodied to be identical in construction. Each placement-into-storage/removal-from-storage arrangement 18-20 comprises a container transfer position 25 with a tray 26 beneath which an entry surface 27 is provided. The entry surface 27 can be formed on the floor 11.

If the loading vehicle with the container 5 located thereon is driven into the placement-into-storage/removal-from-storage arrangement 18-20, then the loading vehicle 8 has lifted the container 5 far enough that it is located above the tray 26. Once the loading vehicle 8 has arrived in the placement-into-storage/removal-from-storage arrangement 18-20, it can lower the container 5 so that the container 5 comes to rest on the tray 26. The loading vehicle 8 is then free for further transport or restacking operations. If the loading vehicle 8 is to pick up the container 5 again for placement into storage, it once again drives under the tray 26, lifts the container so that the container comes free of the tray 26. The loading vehicle 8 with the container 5 can then drive out of the placement-into-storage/removal-from-storage arrangement 18-20.

A control device 100 is provided that is connected to the loading vehicles 8 in a wireless or even wired (for example, via guide rails) manner. The control device 100 controls the loading vehicles 8 so that they can pick up the containers 5 from the container receiving spaces 2 or place the containers 5 into storage again in the container receiving spaces 2.

The control device 100 thereby determines the position of the containers 5 in the respective container receiving spaces 2 according to the turnover frequency of the containers 5. A container 5 that is needed more frequently and thus has a high turnover frequency is arranged in a lower region of a stack 6.

If a container 5 is to be removed from a container receiving space 2 and this container 5 is the bottom container of a stack 6, the removal-from-storage operation is correspondingly short. The loading vehicle 8 merely needs to remove the bottom container and transport it out of the loading space 7 to the placement-into-storage/removal-from-storage arrangement 18.

If the container being removed from storage is not the bottom container of a stack, but rather several containers are located below the container being removed from storage, then the loading vehicle 8 must first remove the containers respectively located below the container being removed from storage and stow them in other container receiving spaces 2 before it can remove the container being removed from storage. If enough loading vehicles 8 are present, then the containers not currently needed, that is, the containers located below the container being removed from storage, can also be stored temporarily on loading vehicles 8.

The same line of thinking applies for the placement of the containers 5 into storage in the container receiving spaces 2.

A further criterion for the placement of containers 5 into storage with regard to the turnover frequency is the distance of the respective container receiving spaces 2 from the entry region 14. The more frequently a container 5 is needed, that is, the greater the turnover frequency thereof is, the closer the container 5 is arranged to the entry region 14. In this manner, the trip times for the loading vehicles 8 can be kept short.

In many cases, the turnover frequency of the respective containers 5 will be known. It depends on the products placed into storage in the containers, for which products it is often known how frequently they are in demand.

However, the control device 100 can also be capable of determining the turnover frequency of the containers 5 dynamically during operation. In this case, the containers 5 are initially distributed randomly in the container receiving spaces 2. The control device 100 then counts how often a container 5 is removed from the container receiving spaces 2 and, for example, subsequently changes the position of the container 5 within the stack 6 or selects a different container receiving space 2 for placing the container 5 into storage.

The foregoing examples have been provided merely for the purpose of explanation and are in no way to be construed as limiting of the present invention. While the present invention has been described with reference to an exemplary embodiment, it is to be understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A stacking storage arrangement comprising:
    a structure defining multiple container receiving spaces arranged in multiple rows and columns and a loading space, each of the container receiving spaces being configured to form a stack of containers;
    the container receiving spaces being configured to introduce the containers from below and are also configured to remove the containers from below;
    the containers are configured to be placed into the container receiving spaces and that multiple container are arranged on top of one another to form a stack;
    at least one loading vehicle configured to be movable into, and removable from, the loading space below the container receiving spaces;
    the loading vehicle is configured to be moved, at least outside of the loading space, obliquely to the direction of the rows and columns, forming an angle >0° with the direction of the rows and an angle >0° with the direction of the columns;
    multiple placement-into-storage/removal-from-storage arrangements are provided, at least one of which is arranged outside of an extension of a row;
    at least one placement-into-storage/removal-from-storage arrangement has at least one container transfer position for transferring a container from the placement-into-storage/removal-from-storage arrangement to the loading vehicle or vice versa.

2. The stacking storage arrangement according to claim 1, wherein:
    the loading space comprises an entry region arranged at front faces of the rows and/or columns.

3. The stacking storage arrangement according to claim 1, wherein:
    the loading vehicle is configured to be moved between rows in the loading space.

4. The stacking storage arrangement according to claim 1, wherein:
    the loading space comprises a driving surface), an extension of said driving surface extending outside of the loading space.

5. The stacking storage arrangement according to claim 4, further comprising:
    uprights and wherein the driving surface has a distance from a floor on which the uprights of the stacking storage arrangement stand, and wherein the driving surface continues into the floor in or in front of the entry region.

6. The stacking storage arrangement according to claim 5, wherein:
    the container transfer position comprises a tray beneath which an entry surface for the loading vehicle is arranged.

7. The stacking storage arrangement according to claim 1, wherein:
    a removal-from-storage arrangement is arranged in front of the entry region.

8. The stacking storage arrangement according to claim 7, wherein:
    the removal-from-storage arrangement is arranged between the entry region and a transfer element.

9. The stacking storage arrangement according to claim 1, wherein:
    at least one placement-into-storage arrangement is arranged in a region that extends parallel to the rows.

10. The stacking storage arrangement according to claim 1, further comprising:

a controller provided to specify a position of a container in the container receiving spaces as a function of a turnover frequency of the container.

11. The stacking storage arrangement according to claim 10, wherein:
the controller specifies a position of a container having a relatively higher turnover frequency in a lower region of a container receiving space.

12. The stacking storage arrangement according to claim 10, wherein:
the controller specifies a position of a container having a higher turnover frequency in a column that is closer to the entry region than a position of a container having a lower turnover frequency.

13. The stacking storage arrangement according to claim 10, wherein:
the controller determines the turnover frequency of containers dynamically during operation.

\* \* \* \* \*